3,384,665
DIFLUOROAMINES AND PROCESS FOR
MAKING SAME
Carl L. Bumgardner, Huntsville, Ala., assignor, by mesne
assignments, to the United States of America as represented by the Secretary of the Army
No Drawing. Filed May 7, 1964, Ser. No. 365,837
10 Claims. (Cl. 260—583)

The present invention relates to a method for synthesizing compounds containing the difluoroamino group (—NF$_2$) through photolysis and to certain novel compounds thereby produced. Particularly the invention concerns a method for producing difluoroamino-substituted derivatives of the alkenes through the photochemical activation of tetrafluorohydrazine in the presence of these alkenes.

Compounds containing the difluoroamino substituent have recently found use as polymerization catalysts and as oxidizer and/or fuel components in both solid and liquid rocket propellants. The compounds of the present invention can be utilized as intermediates for synthesizing polymerization catalysts of the type shown in U.S. Patent 2,963,468. When used as intermediates the hydrocarbon portion of the compound is completely fluorinated according to standard techniques for forming perfluoroalkyl compounds. Moreover, the compounds per se can be used directly as fuel components in rocket propellants. Since they contain a difluoroamino substituent (which furnishes fluorine for combustion) they provide improved performance over the liquid aliphatic hydrocarbon fuels now in use. In addition, the compounds containing an ethylenic linkage (C=C) can be polymerized according to standard techniques and used as a binder fuel component in solid propellants.

The compounds of the present invention correspond to the following formulae:

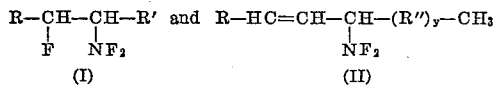

wherein R and R′ are hydrogen or lower alkyl groups (methyl, ethyl, propyl, isopropyl, butyl, hexyl), R″ is a lower alkylene group (methylene, ethylene, propylene (1,3), propylene (2,3), butylene (1,4), and the like), and x is zero or one with the proviso that the total number of carbon atoms per molecule not be in excess of ten and preferably not in excess of six.

The compounds are produced in a vapor phase reaction which results from contacting photochemical activated difluoroamino free radicals with a vaporized alkene. In the actual synthesis, a stoichiometric excess of tetrafluorohydrazine and the vaporized alkene are irradiated with a light source that emits a substantial portion of its radiation at a wavelength of about 2500 A. to about 2700 A. and preferably as close to 2600 A. as possible (2600 A. being the absorption peak for ·NF$_2$). A low pressure mercury vapor lamp is ideally suited as a source of radiation. Gaseous tetrafluorohydrazine actually consists of an equilibrium mixture of tetrafluorohydrazine (F$_2$NNF$_2$) and the difluoroamino free radical (·NF$_2$). Thus, the purpose of the tetrafluorohydrazine is merely to serve as a source of the radical. If the free radical is available from another source, the tetrafluorohydrazine is not necessary. The transitions which results from the irradiation of an equilibrium mixture of tetrafluorohydrazine-difluoroamino free radical in the presence of an alkene are illustrated by 1 through 5 below:

(1) 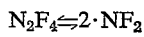

2     ·NF$_2$ $\xrightarrow{h\nu}$ ·NF$_2$*

(* denotes activated radical)
($h$=Planck's constant; $\nu$=frequency)

3 (a) 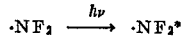

(b) 

(c) 

4 (a) 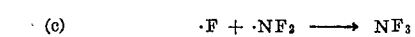

(b) 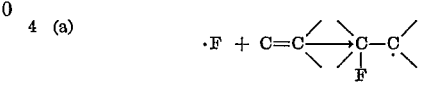

5
(a)     ·F + R$_0$—H → HF + ·R$_0$
(b)     ·R$_0$ + ·NF$_2$ → RNF$_2$ (where R$_0$ is an alkyl or alkenyl group).

Whether fluorine actually exists as the free radical, ·F, is not certain. However, the irradiation of the difluoroamino radical does represent a convenient method of generating the equivalent of fluorine atoms under mild conditions.

Any vaporized branched or straight chain alkene is operative in the process. However, because the conditions for obtaining an alkene of more than ten carbon atoms as a vapor become more complex, the process is usually not practical with an alkene having more than ten carbon atoms. The alkenes for synthesizing compound (I) will have the Formula (Ia) R—HC=CH—R′ and those for compound (II) will have the Formula (IIa)

R—HC=CH—CH$_2$—(R″)$_x$—CH$_3$ where R, R′, R″, and x are as previously defined. It should be noted that Formula IIa is actually a special case of Formula Ia wherein R′ is —CH$_2$—(R″)$_x$—CH$_3$.

The irradiated difluoroamino free radical reacts with the alkene in one of two ways. The fluorine free radical (or its equivalent) and a difluoroamino free radical can undergo an addition reaction at the double bond as shown in Equation 4. The other possibility is for the fluorine radical (or its equivalent) to react with a hydrogen attached to a saturated carbon atom forming an alkyl free radical which immediately combines with a difluoroamino free radical as shown in 5(b).

As is readily apparent from equations 1 through 5, optimum yields of the products required a stoichiometric excess of tetrafluorohydrazine due to the number of possible side reactions. Generally, however, there is no advantage to an excess of tetrafluorohydrazine in excess of about three times the stoichiometric amount. If less than optimum yields are satisfactory, the use of an excess of tetrafluorohydrazine is not essential.

Since the reactants are vapors it is necessary to carry out the reaction in a closed vessel. Water and oxygen should be excluded from the reaction vessel since tetrafluorohydrazine will react with either. The temperature and pressure at which the reaction is conducted are not critical except to the extent required to keep at least a portion of the tetrafluorohydrazine and the alkene in the form of a vapor so that the reaction can proceed. Therefore, the temperature and pressure for a particular reaction will depend on the vapor pressure of the alkene reactant as tetrafluorohydrazine will be in the form of a vapor at all temperatures under which any alkene would have a vapor pressure (the boiling point of tetrafluorohydrazine is —75° C.). Normally, the reaction will be conducted in a partial vacuum although the reaction will proceed at atmospheric pressure or super-atmospheric pressure if the alkene still exhibits some vapor pressure. Ordinarily there is no advantage in carrying out the reaction at a temperature greater than the boiling point of the alkene reactant and it is convenient to conduct the reaction at room temperature if the vapor pressure of the alkene permits. Obviously, as the alkenes approaches a carbon content of ten, their vapor pressures decrease. Octene-2, for example, boils at about 125° C. (standard pressure) whereas butene-2 boils at 3.7° C. (standard pressure). Thus, the application of mild heat (for example, to a temperature of about 75° C.) and/or an increase in the total volume of the reaction vessel will expedite the reaction with octene-2 and other alkenes of similar molecular weight. Again, it should be pointed out that as long as the reaction is conducted at a temperature at which the alkene has any vapor pressure, the process is operable.

The following examples further illustrate the invention.

EXAMPLE I

Reaction of butene-2 with the activated difluoroamino radical

A mixture of 5 millimoles of trans-butene-2 and 5 millimoles of $N_2F_4$ was placed in a Pyrex vessel fitted with a manometer and an internally sealed Hanovia SC 2537 cold cathode low pressure mercury vapor lamp (95% of emitted radiations has wavelength of 2537 A.). The mixture was irradiated with the lamp at room temperature (68° F. to 72° F.) until the manometer indicated no further pressure decrease (about 78 minutes after irradiation was begun). The reaction products were then pumped in a high vacuum system through three traps in series, the first cooled in a dry ice-acetone bath, the second in methylcyclopentane slush, and the third in liquid nitrogen. The Dry Ice-acetone fractions from six such reactions were combined and chromatographed in the gas phase at 45° C. through a 10 ft. x ¼ in. stainless steel column packed with dinonylphthalate on Chromosorb. This procedure resolved the Dry Ice-acetone fraction into two compounds: (1) 1-difluoroaminobutene-2

$(CH_3—CH=CH—CH_2—NF_2)$ and (2) 2-fluro-3-difluoroaminobutene $(CH_3—CH(F)—CH(NF_2)—CH_3)$ The ratio by weight of 1-difluoroaminobutene-2 to 2-fluoro-3-difluoroaminobutane after their gas phase chromotegraphic separation was about 0.8:1.0. An analysis of (1) and (2) gave the following results:

(1) Percent F: Calculated—37.62. Found—37.21.
(2) Calculated, percent: 44.88, F; 6.3, H; 37.79, C. Found, percent: 45.91, F; 6.9, H; 38.24, C.

The $F^{19}$ nuclear magnetic resonance spectrum of I showed a single resonance at —5236 c.p.s. (referred to external trifluoroacetic acid at 40 megacycles; negative values indicating resonance at lower field than the standard). The $H^1$ nuclear magnetic resonance (NMR) spectrum (referred to external benzene at 40 megacycles; negative values indicate resonance at lower field than the standard) exhibited signals at 59 c.p.s. (vinyl); 97, 128, and 153 (a triplet due to the coupling of the methylene hydrogens with fluorine); and at 212 c.p.s. (methyl hydrogens) in the ratio expected from a compound having Formula 1. Infrared analysis of (1) was also consistent showing bonds a 3100 cm.$^{-1}$ (vinyl H), 1680 cm.$^{-1}$ (double bond), and at 923, 898, and 873 cm.$^{-1}$ (NF). The compound exists as a mixture of isomers (probably threo and erythro isomers) resulting from the indiscriminate difluoroamino radical reaction. The $F^{19}$ NMR spectrum of (2) exhibited bonds centered about —4693 c.p.s. (NF's) and at +4130 and +4413 c.p.s. (CF's) in the ratio of 2:1, respectively. Infrared analysis of (2) indicated that the compound was saturated (no absorption at 3100 cm.$^{-1}$ confirmed the presence of the C—F bond. Bonds at 918 and 870 cm.$^{-1}$ established the presence of the C—NF$_2$ bond. A set of signals observed at 207 to 239 c.p.s. in the $H^1$ NMR spectrum established the presence of C-methyl groups.

EXAMPLE II

Reaction of ethene with the activated difluoroamino radical

Following the same procedure as set forth in Example I, five millimoles of ethene was substituted for the trans-butene-2. Gas phase chromatography was used to resolve the Dry Ice-acetone fraction yielding only 1-fluoro-2-difluoroaminoethene [CH$_2$(F)—CH$_2$(NF$_2$)]. Chemical analysis, the nuclear magnetic resonance spectrum, and infrared analysis confirmed the structure of the reaction product.

The compounds produced by the irradiation of the difluoroamino radical in the presence of specific alkenes are presented in Table I.

TABLE I

| Alkene Reactant | Type I Product | Type II Product |
|---|---|---|
| (1) Ethene | CH$_2$—CH$_2$<br>$\mid$ $\mid$<br>F NF$_2$ | (¹) |
| (2) Butene-2 | CH$_3$—HC—CH—CH$_3$<br>$\mid$ $\mid$<br>F NF$_2$ | CH$_3$—CH=CH—CH<br>$\mid$<br>NF$_2$ |
| (3) Pentene-2 (a) | CH$_3$—CH—CH—CH$_2$—CH$_3$<br>$\mid$ $\mid$<br>F NF$_2$ | (c) CH$_3$—CH$_2$—CH=CH$_2$—CH$_2$<br>$\mid$<br>NF$_2$ |
| (b) | CH$_3$—CH—CH—CH$_2$—CH$_3$<br>$\mid$ $\mid$<br>NF$_2$ F | (d) CH$_3$—CH—CH=CH—CH$_3$<br>$\mid$<br>NF$_2$ |
| (4) Hexene-1 (a) | CH$_2$—CH—(CH$_2$)$_3$—CH$_3$<br>$\mid$ $\mid$<br>F NF$_2$ | (e) CH=CH—CH—(CH$_2$)$_2$—CH$_3$<br>$\mid$<br>NF$_2$ |
| (b) | CH$_2$—CH—(CH$_2$)$_3$—CH$_3$<br>$\mid$ $\mid$<br>NF$_2$ F | |

¹ No Type II product when alkene is Ethene.

If the alkene contains more than one double bond, the number of possible products greatly increases. When an alkane is substituted for the alkene, only Type II products are formed.

If the alkene is symmetrical about the double bond as is butene-2, only one of each type of product is produced as shown in Table I. However, if the alkene is not symmetrical about the double bond, then mixtures of isomers are produced. For example, pentene-2 is not symmetrical with respect to the double bond. Therefore, when the fluorine radical and the difluoroamino radical add to the double bond, two products are produced: 2-fluoro-3-difluoroamino-pentane and 2 - difluoroamino - 3 - fluoro-pentane. This is due to the fact that the radicals add to the double bond indiscriminately. The two isomers are produced in about equal amounts as would be expected. In the same manner, when the fluorine radical combines with a hydrogen from a saturated allylic carbon atom, it does so indiscriminately (an allylic carbon atom is a carbon atom immediately adjacent to either of the carbons forming the double bond). Since the difluoramino radical combines with the alkene radical at the carbon atom which furnished the hydrogen to the fluorine radical, there are two possible difluoroamino-substituted products depending on which of the two allylic carbon atoms is involved. This accounts for the two products (3)(c) and (3)(d) shown in Table I. The isomers are produced in substantially equal amounts. Very minor amounts of isomers having the difluoramino substituent at a saturated carbon other than an allylic carbon are possible.

From the above discussion it is obvious that the alkenes of the formula M—HC=CH—Z where M and Z are identical and selected from the lower alkyl groups of up to four carbon atoms will react in such a manner that only one Type I and one Type II product is possible. This is due to the symmetry of these alkenes with respect to the double bond. It should be pointed out, however, that the various products produced from unsymmetrical alkene reactants are all included within the scope of the invention. Moreover, it should be apparent that all these isomers have the utility indicated above.

Substituting other alkenes such as propene, pentene-1, pentene-2, 3-methylpentene-2, hexene-1, 3-methyl-hexene-1, and the like according to the procedure set forth in Examples 1 and 2 permits the preparation of the corresponding difluoramino substituted alkane and the fluoro-difluoroamino substituted alkane.

Under the temperature conditions set forth in Example I (room temperature) the two compounds produced condense as liquids and are not available for further reaction. If the temperature in the reaction vessel were high enough to keep at least part of the products vaporized, other products would be produced. At least part of these products would conform to the formula

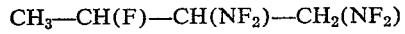

$CH_3$—$CH(F)$—$CH(NF_2)$—$CH_2(NF_2)$ or

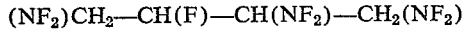

$(NF_2)CH_2$—$CH(F)$—$CH(NF_2)$—$CH_2(NF_2)$

Both formulae are possible and would result from the combination of reactions described in Equatons 4 and 5 above.

The above description is for purposes of illustration only and should not be construed as a limitation of the invention except as reflected in the appended claims.

I claim:
1. A compound of the formula

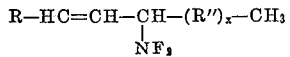

R—HC=CH—CH—(R″)$_x$—CH$_3$
              |
              NF$_2$ wherein R is a member selected from the group consisting of hydrogen and lower alkyl, R″ is a lower alkylene group, and $x$ is zero or one, the total number of carbon atoms in the molecule not to exceed 10.

2. 1-difluoroaminobutene-2.

3. The process which comprises contacting in the vapor phase difluoroamino free radicals and an alkene in the presence of radiation from a source which emits a substantial portion of its radiation at a wavelength of about 2500 A. to 2700 A.

4. The process according to claim 3 wherein said source is a low pressure mercury vapor lamp.

5. The process according to claim 4 wherein said alkene is ethene.

6. The process according to claim 4 wherein said alkene is butene-2.

7. The process which comprises contacting in the vapor phase tetrafluorohydrazine and an alkene of up to 10 carbon atoms in the presence of radiation from a source which emits a substantial portion of its radiation in wavelengths of about 2500 A. to about 2700 A.

8. The process of claim 7 wherein said source is a low-pressure mercury vapor lamp.

9. The process of claim 8 wherein said alkene is ethene.

10. The process of claim 8 wherein said alkene is butene-2.

References Cited

UNITED STATES PATENTS 3,166,595   1/1965   Frazer _____ 260—583

OTHER REFERENCES

Hoffman et al., Chemical Reviews, vol. 62, pages 1 to 18 (1962).

CHARLES B. PARKER, *Primary Examiner.*

L. A. SEBASTIAN, R. RAYMOND,
*Assistant Examiners.*